(12) United States Patent
Faaborg et al.

(10) Patent No.: US 12,518,118 B2
(45) Date of Patent: Jan. 6, 2026

(54) SYSTEM AND METHOD PROVIDING FOR SELF-HEALING VISUAL CODES

(71) Applicant: GOOGLE LLC, Mountain View, CA (US)

(72) Inventors: Alexander James Faaborg, Mountain View, CA (US); Brett Barros, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 18/044,174

(22) PCT Filed: Sep. 21, 2020

(86) PCT No.: PCT/US2020/070559
§ 371 (c)(1),
(2) Date: Mar. 6, 2023

(87) PCT Pub. No.: WO2022/060396
PCT Pub. Date: Mar. 24, 2022

(65) Prior Publication Data
US 2023/0325620 A1 Oct. 12, 2023

(51) Int. Cl.
*G06K 7/14* (2006.01)
(52) U.S. Cl.
CPC ......... *G06K 7/1473* (2013.01); *G06K 7/1404* (2013.01); *G06K 7/1434* (2013.01); *G06K 7/1443* (2013.01); *G06K 7/1447* (2013.01)
(58) Field of Classification Search
CPC ............................. G06Q 10/08; G06Q 10/087
(Continued)

(56) References Cited

U.S. PATENT DOCUMENTS 6,363,484 B1 3/2002 Cordery et al.
8,886,172 B2 11/2014 Gomez
(Continued)

FOREIGN PATENT DOCUMENTS

| CN | 107220691 A | 9/2017 |
| WO | 2019149020 A1 | 8/2019 |
| WO | 2020140925 A1 | 7/2020 |

OTHER PUBLICATIONS

International Search Report and Written Opinion for PCT Application No. PCT/US2020/070559, mailed on Jun. 16, 2021, 11 pages.

*Primary Examiner* — Suezu Ellis
(74) *Attorney, Agent, or Firm* — Brake Hughes Bellermann LLP

(57) ABSTRACT

A system and method is provide which allows supplemental information to be used, in combination with a portion of a visual code that is readable, to identify the visual code, and to provide information related to the visual code, even in the event of a scan of a compromised visual code and/or an inadequate scan of the visual code which yields only a portion of the data payload associated with the visual code. The supplemental information may include, for example, location based information, image based information, audio based information, and other types of information which may allow the system to discriminate a location of the scanned visual code, and to identify the scanned visual code visual code based on the portion of the data payload and the supplemental information.

19 Claims, 13 Drawing Sheets

(58) Field of Classification Search
USPC .................. 235/462.01–462.49, 385; 705/28
See application file for complete search history.

(56) References Cited

U.S. PATENT DOCUMENTS

| | | | |
|---|---|---|---|
| 11,922,268 B1* | 3/2024 | Lupo | G06K 7/1413 |
| 2008/0142599 A1 | 6/2008 | Benillouche et al. | |
| 2009/0303036 A1* | 12/2009 | Sahuguet | G06F 16/434 |
| | | | 340/539.13 |
| 2013/0290106 A1 | 10/2013 | Bradley et al. | |
| 2014/0058812 A1 | 2/2014 | Bender et al. | |
| 2022/0262089 A1* | 8/2022 | Ma | G06V 10/245 |

\* cited by examiner

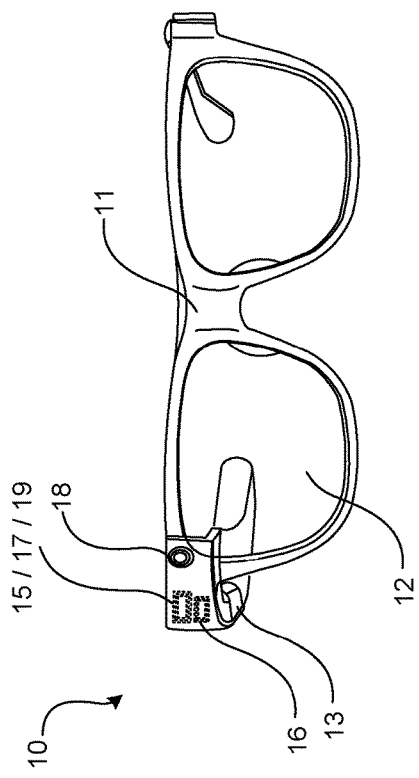
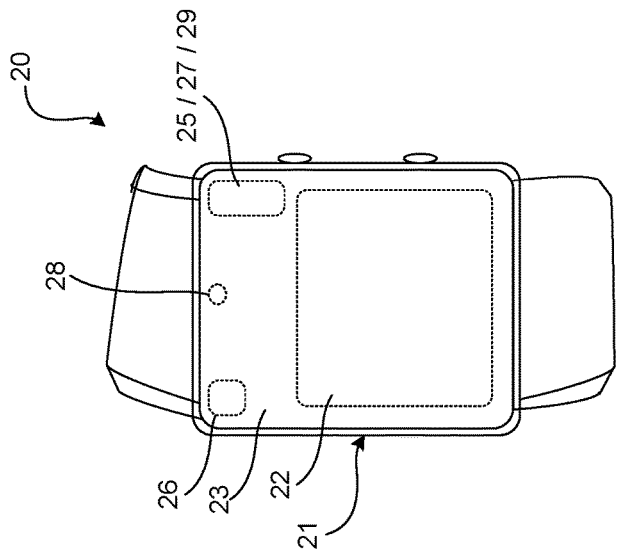
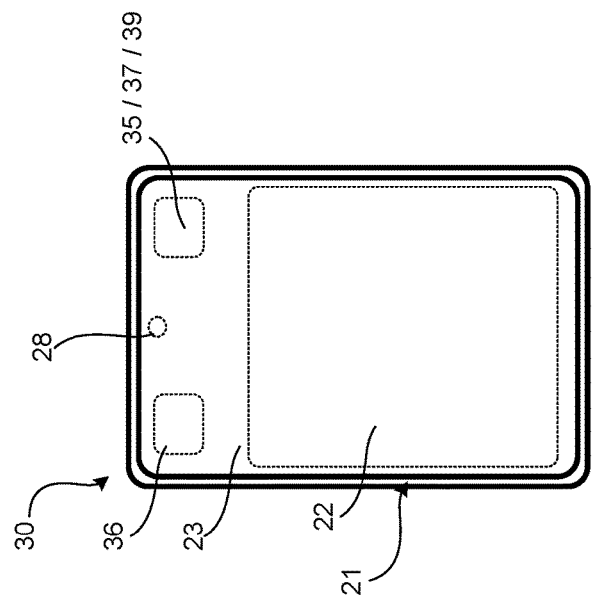
FIG. 2A
FIG. 2B
FIG. 2C

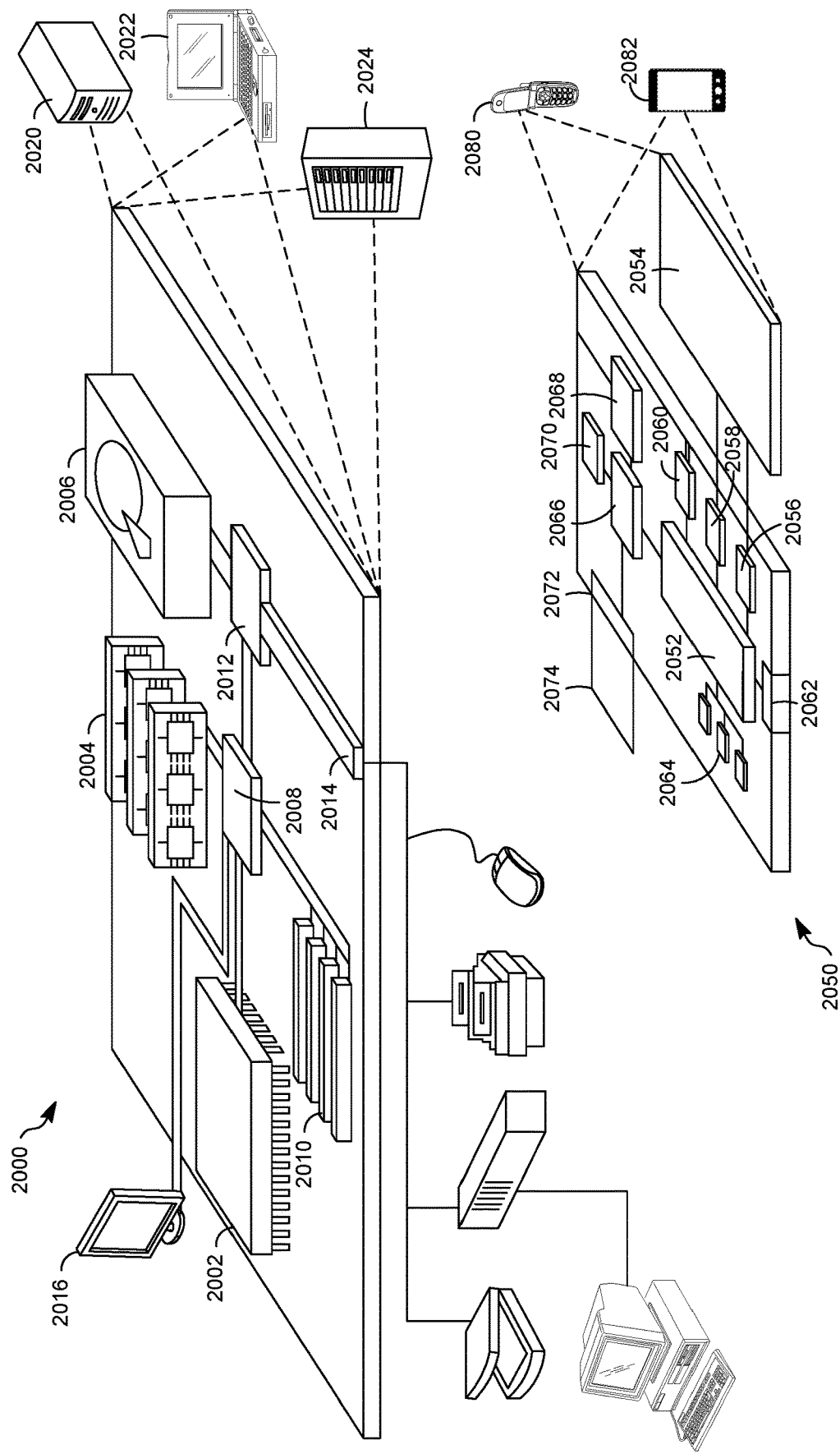

SYSTEM AND METHOD PROVIDING FOR SELF-HEALING VISUAL CODES

CROSS REFERENCE TO RELATED APPLICATION

This application is a 35 U.S.C. § 371 National Phase Entry Application from PCT/US2020/070559 filed Sep. 21, 2020, designating the U.S., the disclosure of which is incorporated herein by reference in its entirety.

BACKGROUND

The use of machine-readable visual codes, or labels, may provide additional information associated with the entity to which the code or label is attached or associated. Such machine-readable visual codes or labels may, for example, direct the user to a website or application related to the entity, providing for relatively quick access to information, data and the like in response to a scan of the code or label. In some situations, these types of visual codes may be susceptible to physical damage and/or in some way compromised, and/or a scan of the code may be incomplete, rendering the code unreliable, and in some situations, essentially non-functional. Redundancy in the code data, and/or augmentation of the code data, may provide a way to compensate for the code data that is not otherwise retrievable by a scan of the compromised code.

SUMMARY

In one aspect, a computer-implemented method includes receiving, by a server, a request from a user electronic device, the request including a data payload associated with a scan of a visual code; detecting, by the server, that the received data payload associated with the scan of the visual code is insufficient to identify the scanned visual code; detecting, by the server, supplemental information associated with the scanned visual code; accessing, by the server, an indexed database including a plurality of visual codes previously stored in the database; matching, by the server, the scanned visual code with one of the plurality of visual codes stored in the database based on the data payload and the supplemental information; and transmitting, from the server to the user electronic device, a response to the request in response to the matching.

In some implementations, accessing, by the server, of the indexed database, includes accessing, by the server, a plurality of data payloads respectively associated with the plurality of visual codes previously stored in the database; and accessing, by the server, anchoring information associated with the plurality of visual codes previously stored in the database. In some implementations, matching of the scanned visual code with one of the plurality of visual codes stored in the database includes comparing the data payload associated with the scan of the visual code to the plurality of data payloads respectively associated with the plurality of visual codes stored in the database; and comparing the detected supplemental information associated with the scan of the visual code to the anchoring information associated with the plurality of visual codes stored in the database. In some implementations, matching of the scan of the visual code with one of the plurality of visual codes stored in the database includes identifying the scanned visual code based on at least one of the comparison of the data payload associated with the scanned visual code to the plurality of data payloads associated with the previously stored visual codes, or the comparison of the detected supplemental information associated with the scan of the visual code to the anchoring information associated with the plurality of previously stored visual codes.

In some implementations, detecting of the supplemental information associated with the scanned visual code includes at least one of detecting location based information associated with the scan of the visual code; detecting image based information in an area surrounding the scan of the visual code; detecting character based information in the area surrounding the scan of the visual code; or detecting audio based information associated with the scan of the visual code. In some implementations, detecting location based information includes detecting global positioning system coordinates associated with a location of the scan of the visual code; detecting image based information includes receiving a delineation of persistent features in an area surrounding the location of the scan of the visual code; and detecting character based information includes receiving character information captured within the area surrounding the scan of the visual code. In some implementations, detecting of the image based information includes detecting stationary elements in the area surrounding the scan of the visual code; and detecting a contour delineating the detected stationary elements.

In some implementations, matching of the scanned visual code with one of the plurality of visual codes previously stored in the database includes at least one of matching the detected location information associated with the scan of the visual code to location information associated with one of the plurality of visual codes previously stored in the database; matching the detected image based information associated with the scan of the visual code with image information associated with one of the plurality of visual codes previously stored in the database; matching the detected character based information associated with the scan of the visual code with character based information associated with one of the plurality of visual codes previously stored in the database; or matching the detected audio based information associated with the scan of the visual code with audio based information associated with one of the plurality of visual codes previously stored in the database. In some implementations, receiving, by the server from the user electronic device, of the request for source information includes at least one of receiving the request for source information based on the scan of the visual code, the visual code being damaged; or receiving the request for source information based on the scan of the visual code, the scan of the visual code being incomplete.

In some implementations, matching of the scanned visual code with one of the plurality of visual codes stored in the database includes comparing the data payload associated with the scan of the visual code to a plurality of complete data payloads respectively associated with the plurality of visual codes previously stored in the database; and identifying the scanned visual code based on the comparison of the data payload associated with the scan of the visual code to the plurality of data payloads respectively associated with the plurality of visual codes previously stored in the database. In some implementations, matching of the scanned visual code with one of the plurality of visual codes stored in the database includes comparing the detected supplemental information associated with the scan of the visual code to anchoring information associated with the plurality of visual codes previously stored in the database; and identifying the scanned visual code based on the comparison of the data payload associated with the scan of the visual code to the plurality of data payloads associated with the plurality of visual codes previously stored in the database, and the comparison of the detected supplemental information associated with the scan of the visual code and the anchoring information associated with the plurality of visual codes previously stored in the database.

In some implementations, matching of the scanned visual code with one of the plurality of visual codes stored in the database includes comparing, by the server, the data payload and the supplemental information associated with the scan of the visual code, with the plurality of visual codes previously stored in the database and anchoring information associated with the previously stored plurality of visual codes; identifying, by the server based on the comparison, a visual code of the plurality of previously stored visual codes, corresponding to the supplemental information associated with the scan of the visual code; and detecting, by the server, a mismatch between the scanned visual code and the identified visual code. In some implementations, transmitting of the response includes transmitting, by the server to the user electronic device, an indication of the mismatch in response to the request. In some implementations, transmitting of the response includes at least one of transmitting source information in response to the request and the scan of the visual code based on the matching; or triggering an action defined by the request based on the matching.

In some implementations, detecting that the received data payload is insufficient to identify the scanned visual code includes detecting no data in the data payload associated with the scan of the visual code; comparing the supplemental information associated with the scanned visual code with anchoring information associated with the plurality of visual codes previously stored in the database; and identifying the scanned visual code based on the comparison.

In some implementations, detecting, by the server, the supplemental information associated with the scanned visual code includes receiving, by the server, the supplemental information associated with the scanned visual code from the user electronic device.

In another general aspect, a computer-implemented method includes receiving, by a server, at least one visual code including a data payload defining the at least one visual code; storing, by the server, the at least one visual code including the data payload in a database; receiving, by the server, anchoring information associated with a location of the at least one visual code; associating, by the server, the anchoring information with the at least one visual code and the data payload; and triggering, by the server, access to the at least one visual code, the data payload, and the anchoring information, in response to a request, received by the server from an external electronic device, for identification of a visual code scanned by the external electronic device including a data payload that is insufficient to identify the scanned visual code.

In some implementations, receiving of the anchoring information includes at least one of receiving location based information identifying a location of the at least one visual code; receiving image based information associated with the location of the at least one visual code; or receiving character based information associated with the location of the at least visual code. In some implementations, receiving image based information includes receiving a delineation of persistent features in an area surrounding the location of the visual code; and receiving character based information includes receiving character information captured within the area surrounding the location of the visual code.

In some implementations, receiving of the at least one visual code including the data payload includes receiving a plurality of visual codes, each of the plurality of visual codes including a data payload defining the respective visual code; and storing, in the database, the plurality of visual codes, including indexing each of the plurality of visual codes with the respective data payload and the respective anchoring information. In some implementations, triggering, by the server, access to the at least one visual code, the data payload, and the anchoring information, in response to a request, includes receiving, by the server, a request from a user electronic device, the request including a data payload associated with a scan of a visual code; detecting, by the server, that the received data payload associated with the scan of the visual code is insufficient to identify the scanned visual code; detecting, by the server, supplemental information associated with the scanned visual code; comparing, by the server, the data payload associated with the scanned visual code with the data payloads respectively associated with the plurality of visual codes stored in the database, and the supplemental information associated with the scanned visual code with the anchoring information respectively associated with the plurality of visual codes stored in the database; and identifying, by the server, the scanned visual code based on the comparison.

In another general aspect, a system includes a server adapted to receive, from a user electronic device, a request for source information, the request including an incomplete data payload associated with a scan of a visual code; detect supplemental information associated with the scanned visual code; access an indexed database including a plurality of visual codes previously stored in the database; match the scanned visual code with one of the plurality of visual codes in the database; and transmit, to the user electronic device, the requested source information.

In another general aspect, a system includes a server adapted to receive at least one visual code including a complete data payload; store the at least one visual code including the complete data payload in a database; receive anchoring information associated with placement of the at least one visual code at a location; associate the anchoring information with the at least one visual code and the complete data payload; and trigger access to the at least one visual code and the complete data payload in response to a request, received by the server from an external electronic device, for completion of a partial data payload associated with a scan of a visual code by the external electronic device.

BRIEF DESCRIPTION OF THE DRAWINGS

FIGS. 2A-2C are front views of example user electronic devices.

FIG. 8 shows an example of a generic computer device and a generic mobile computer device.

DETAILED DESCRIPTION

Figure 1:
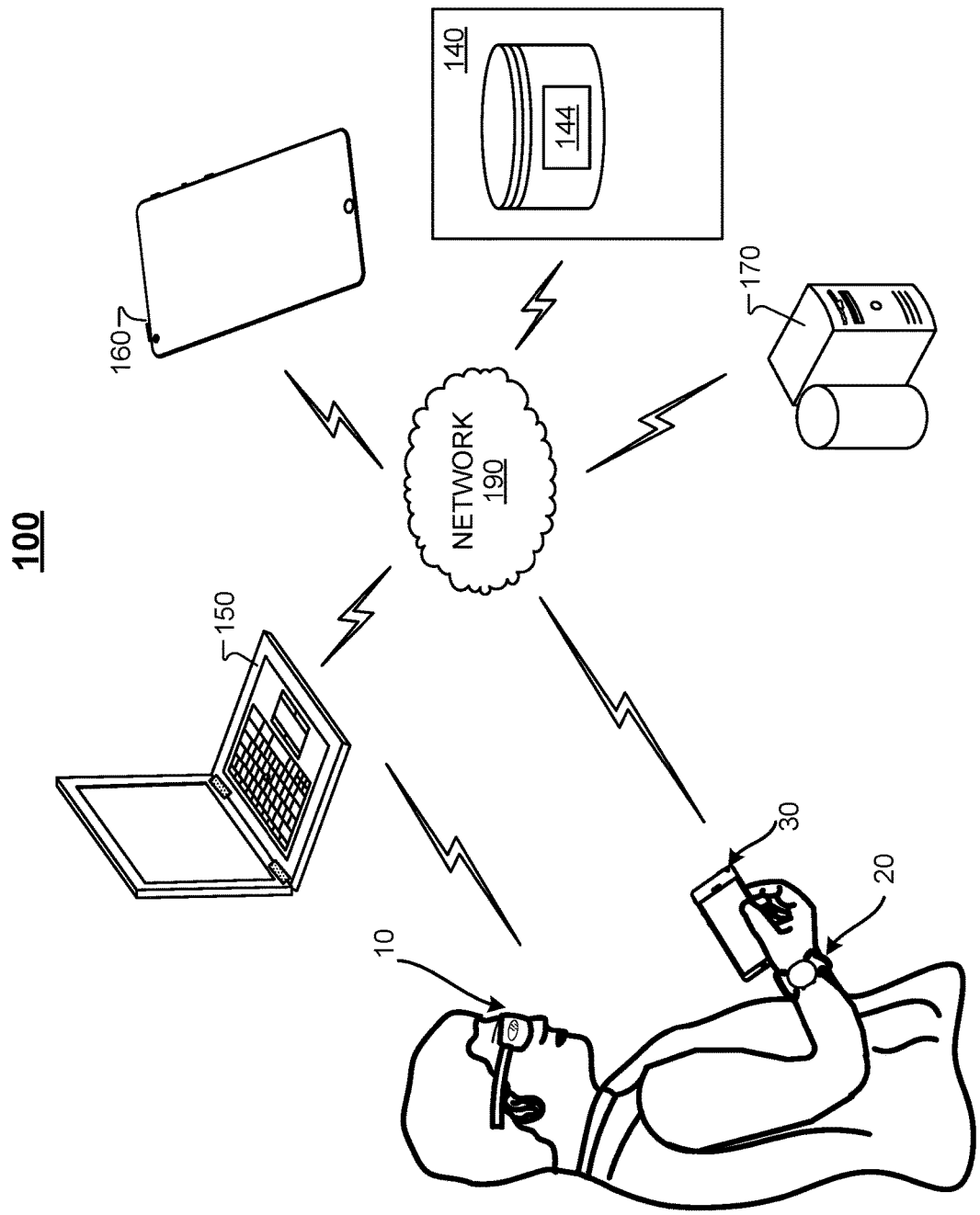
FIG. 1 is a diagram of a system, in accordance with implementations described herein.

Machine-readable visual codes such as, for example, barcodes, quick response (QR) codes, and other such visual codes, may store and/or provide access to information in a machine-readable optical form. The information, or data, stored in and/or accessible via a machine-readable visual code may encompass a broad spectrum of data, including, for example, one or more strings of text, contact information, redirection to a website and more. Visual codes may store this type of data using patterns that uniquely define the data. For example, in some situations, visual codes may include black and white patterns, defined, for example, by black lines, or bars, or dots, or other shapes, and white spaces, contained within the boundaries of the machine-readable visual code. The patterns defining visual codes are not necessarily black and white. Other colors, and/or combinations of colors, may be incorporated in the pattern of the visual code to uniquely define the data associated with the visual code.

In some situations, the scanning or reading of these types of visual codes may be in some way hindered, or compromised, or incomplete, or insufficient, or inadequate, thus rendering the data payload, defined by the pattern of the visual code, incomplete, or not fully resolvable, and/or inaccessible. The visual code may be physically compromised in a number of different ways. For example, one or more portions of the visual code may be missing, and/or damaged, and/or occluded, and/or misshapen and the like. In the case of a substantially physically complete, or intact, code, the image of the visual code captured by the user may be inadequate, or of insufficient resolution, or unclear due to, for example, environmental conditions (lighting, glare, etc.), lens condition, scanning orientation, and the like. A scan of the visual code in these types of circumstances may result in an insufficient capture of the data payload, which would otherwise be defined by the pattern and associated with the visual code, thus rendering the scan of the visual code unresolvable. In absence of enough of the data payload (associated with the complete code) to clearly identify the visual code and the information associated with the visual code, a scan of the compromised visual code, or an insufficient and/or inaccurate scan of the visual code, is likely to return an incomplete or erroneous result, or no result at all.

In a system and method, in accordance with implementations described herein, supplemental information may be used, in combination with the portion of the visual code that is readable, to identify the visual code, and to provide the requested information to the user, even in the event of a scan of a compromised visual code and/or an inadequate scan of the visual code which yields only a portion of the data payload associated with the visual code, or, in some circumstances, essentially none of the data associated with the visual code, to the point where the visual code cannot be identified based on the portion of the data payload retrieved with by the scan.

In some implementations, the supplemental information may include, for example, anchoring information. In some implementations, the anchoring information may be available to the user/the user device from, for example, a database accessible to the user/user device via a network. In some implementations, the anchoring information may provide information that may identify the scanned visual code and augment the associated data payload, for example, to the point at which the scanned visual code may be identified, based on information previously stored in the database in association with the visual code. In some implementations, the supplemental information may include, for example, location information including, for example, global positioning system (GPS) information. In some implementations, the supplemental information may include other types of data that allow for the system to identify the scanned visual code, and supply the data associated with the identified code to the user. In some implementations, the supplemental data may allow the system to discriminate from among a plurality of possible visual codes, based on the data payload available from the compromised code and the supplemental information, to provide information to the user.

Visual codes as described above may be read by a variety of different kinds of electronic devices, or computing devices, that have optical scanning capability. For example, in some implementations, visual codes may be read by handheld devices (such as, for example, smartphones, handheld controllers, and the like) having optical scanning capability, optical sensors, cameras and the like. In some implementations, visual codes may be read by wearable devices (such as, for example, smart glasses, smart watches, and the like) having optical scanning capability, optical sensors, cameras and the like. In some implementations, information that is accessible to users/user devices via visual codes may be accessible via user devices that do not necessarily include optical scanning capability, such as, for example, ear worn devices, hand and/or wrist worn devices, neck worn lanyard type devices and the like. In this situation, detected proximity to the visual code (for example, detection of the device within a threshold of the visual code, in some implementations together with a user input related to the visual code), may trigger a request for the information related to the visual code without actually scanning the visual code. In this example, the supplemental anchoring information may be sufficient to provide for identification of the visual code and the data payload associated with the visual code, without an actual scan of the visual code.

FIG. 1 illustrates a user in connection with an example system 100 for providing data associated with a visual code based on supplemental information associated with the scanning of the visual code, in accordance with implementations described herein. The example system 100 may access supplemental information in response to the scanning of a visual code that yields an incomplete data payload, or a data payload that is insufficient to provide for identification and/or resolution of the visual code, using the supplemental information to augment the data payload. In the example shown in FIG. 1, the user is wearing a first wearable device 10 and a second wearable device 20. The first wearable device 10 is a head mounted display (HMD) device 10, in the form of smart glasses 10, simply for purposes of discussion and illustration. However, the principles to be described herein may be applied to other types of HMDs such as, for example, googles, headsets and the like, having optical scanning capability. The second wearable device 20 is a wrist worn device 20, in the form of a smartwatch 20, simply for purposes of discussion and illustration. However, the principles to be described herein may be applied to other types of hand/wrist worn devices such as, for example, bracelets, rings and the like. The user is holding a handheld device 30. The handheld device 30 may be, for example, a smartphone 30 having optical scanning capability, in the form of, for example a camera, simply for purposes of discussion and illustration. However, the principles to be described herein may be applied to other types of electronic devices, such as, for example, a handheld controller, a tablet device, a laptop computing device, and the like, including devices having optical scanning capabilities, and devices that do not have optical scanning capability.

The example system 100 may include one or more computing and/or electronic devices that can exchange data over a network 190. The devices may communicate via the network 190 and/or over alternative network(s) and/or directly with each other. Example client devices may include, for example, the example wearable devices 10, 20, the example handheld device 30, other electronic devices such as, for example, a laptop or netbook computing device 150, a tablet computing device 160, a desktop computing device 170, and other such devices. A server 140 may be accessible to the devices via the network 190. The server 140 may provide access to a database 144. Information stored in the database 144 may provide for the matching with the data payload of a visual code, given the partial data payload captured in a scan of a compromised visual code, or an insufficient/incomplete scan of a visual code, together with the supplemental information available in association with the visual code FIG. 2A is a front view of the example first wearable device 10 (the example HMD 10) worn by the user in FIG. 1. FIG. 2B is a front view of the example second wearable device 20 (the example smartwatch 20) shown in FIG. 1. FIG. 2C is a front view of the example handheld device 30 held by the user in FIG. 1.

The first wearable device 10, in the form of an HMD 10, or smart glasses 10 in this example, may include a frame 11, with a display device 12 coupled in the frame 11. In some implementations, an audio output device 13 may be coupled to the frame 11. The HMD 10 may include a sensing system 16 including various sensing system devices and a control system 17 including various control system devices to facilitate operation of the HMD 10. The control system 17 may include a processor 19 operably coupled to the components of the control system 17 and a communication module 15 providing for communication with external devices and/or networks. The HMD 10 may also include an image sensor 18 (i.e., a camera 18). In some implementations, the image sensor 18, or camera 18 may be capable of capturing still and/or moving images, patterns, features, light and the like, and/or may be capable of scanning visual codes as described above.

The second wearable device 20, in the form of a smartwatch 20 in this example, may include an interface device 21. In some implementations, the interface device 21 may function as an output device, including, for example, a display area 22 that can output information to the user. In some implementations, the interface device 21 may function as an input device, including, for example, a touch surface 23, allowing the interface device 21 to receive touch inputs from the user. In some implementations, the interface device 21 can function as an input device and an output device. The second wearable device 20 may include a sensing system 26 including various sensing system devices. The second wearable device 20 may include a control system 27 including various control system devices, a communication module 15 providing for communication with external devices and/or a network, and a processor 29, to facilitate operation of the device 20. The second wearable device 20 may also include an image sensor 28 (i.e., a camera 28). In some implementations, the image sensor 28, or camera 28 may be capable of capturing still and/or moving images, and/or may be capable of scanning visual codes as described above.

The handheld device 30, in the form of a smartphone 30 in this example, may include an interface device 31. In some implementations, the interface device 31 may function as an output device, including, for example, a display area 32 that can output information to the user. In some implementations, the interface device 31 may function as an input device, including, for example, a touch surface 33, allowing the interface device 31 to receive touch inputs from the user. In some implementations, the interface device 31 can function as an input device and an output device. The handheld device 30 may include a sensing system 36 including various sensing system devices. The handheld device 30 may include a control system 37 including various control system devices, a communication module 35 providing for communication with external devices and/or a network, and a processor 39, to facilitate operation of the handheld device 30. The handheld device 30 may also include an image sensor 38 (i.e., a camera 38). In some implementations, the image sensor 38, or camera 38 may be capable of capturing still and/or moving images, and/or may be capable of scanning visual codes as described above.

Figure 3:
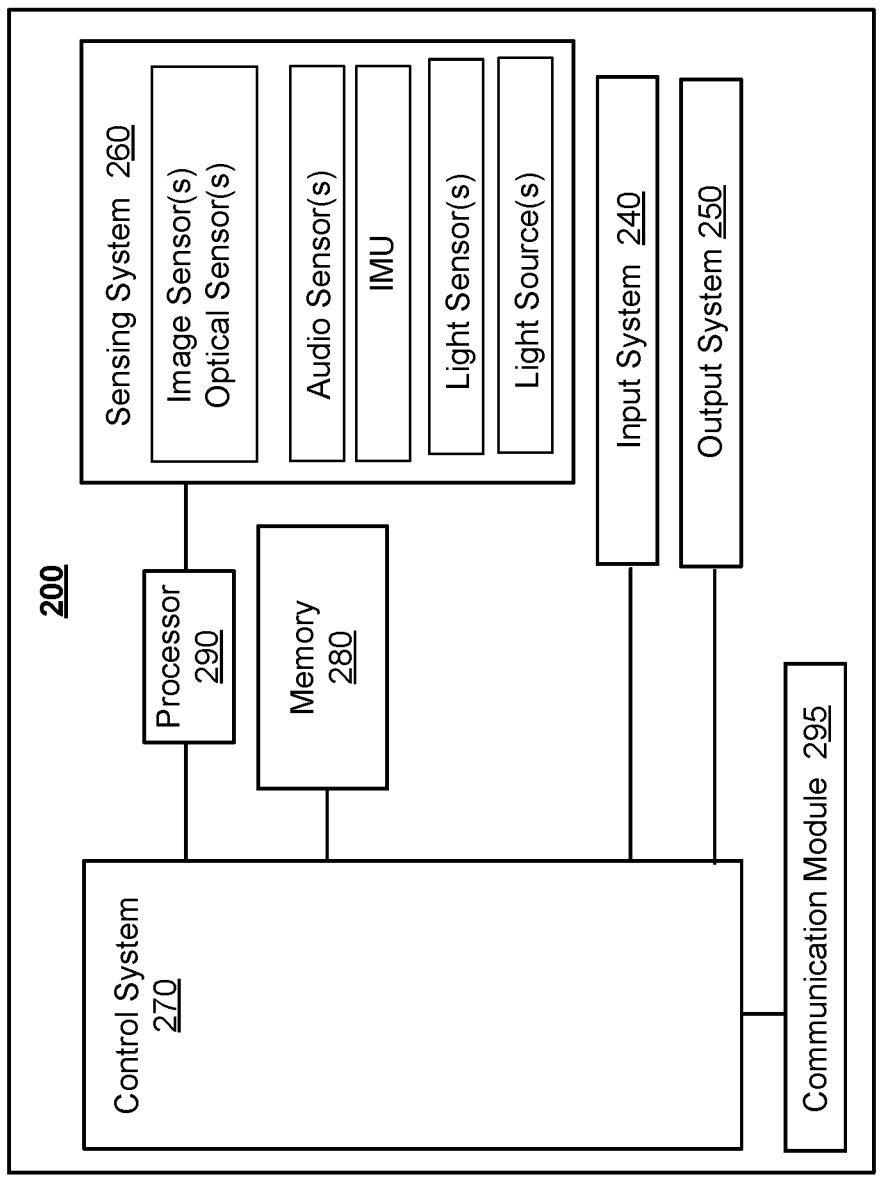
FIG. 3 is a block diagram of a system configured to implement the concepts described herein.

FIG. 3 is a block diagram of an example electronic device 200, such as, for example, one of the example wearable devices 10, 20 shown in FIG. 1, the example handheld device 30 shown in FIG. 1, and/or other electronic devices that may be used to carry out the principles described herein.

The electronic device 200 may include a sensing system 260 and a control system 270. The sensing system 260 may include one or more different types of sensors, including, for example, a light sensor, an audio sensor, an image sensor, a distance/proximity sensor, and/or other sensors and/or different combination(s) of sensors. In some implementations, the sensing system 260 may include an image sensor and/or an optical sensor, that is capable of scanning, or reading, a visual code. The control system 270 may include, for example, power/pause control device(s), audio and video control device(s), optical control device(s), and/or other such devices and/or different combination(s) of devices. The sensing system 260 and/or the control system 270 may include more, or fewer, devices, depending on a particular implementation. The electronic device 200 may include a processor 290 in communication with the sensing system 260 and the control system 270. The processor 290 may process inputs received from the sensing system 260, such as, for example, images and/or optical scans, captured by the image sensor/optical sensor, including, but not limited to, for example, optical scans of visual codes and the like. The electronic device 200 may include an input system 240 that can receive user inputs to be processed by the processor 290 and output by an output system 250 under the control of the control system 270. The input system 240 may include various types of input devices including, for example, a touch input surface, audio input devices that can receive audio inputs (including, for example, audio sensors, or microphones, included in the sensing system 260), a gesture recognition device (including, for example, images captured by image sensors(s) of the sensing system 260 and processed by the processor 290), and other such input devices. The output system 250 may include various types of output devices such as, for example, display device(s), audio output device(s), or speakers, physical and/or tactile output devices, and other such output devices. The electronic device 200 may include a memory 280, and a communication module 295 providing for communication between the electronic device 200 and one or more other, external device(s), networks, servers and the like.

FIGS. 4A-4F illustrate example visual codes 300, which may be read, or detected, or scanned, by an optical sensor, or an optical scanner, or a camera, or other such optical device. In some implementations, the optical device may be included in an electronic device, such as, for example, one of the electronic devices described above with respect to FIGS. 1-3, operated by a user to scan or read the visual code to obtain information associated with the visual code.

Figure 4B:
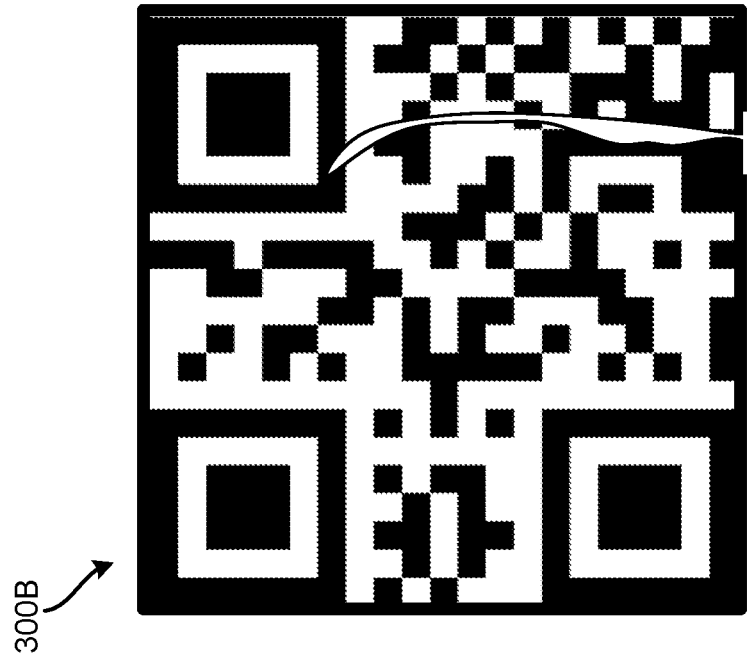
FIGS. 4A through 4I illustrate example visual codes.
Figure 4A:
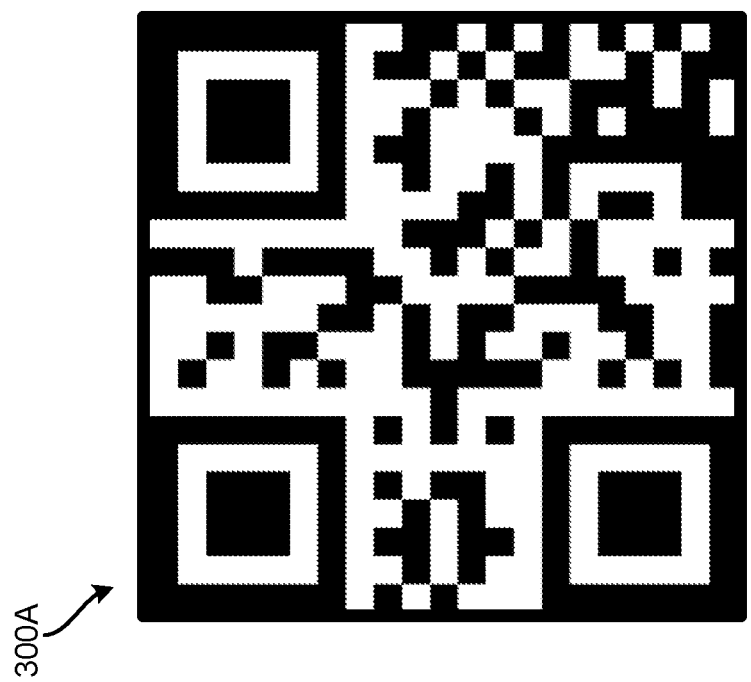

FIG. 4A illustrates an example visual code 300A that is substantially intact. An optical scan, or read, of the intact visual code 300A would allow for the retrieval of a sufficient portion of the data payload associated with the intact visual code 300A to identify the visual code and provide for the return of the associated information to the user.

FIGS. 4B through 4I illustrate example visual codes 300B through 300I that have been in some way compromised, for example, physically compromised, and/or that have experienced some manner of an incomplete, or insufficient, or compromised scan. For example, FIG. 4B illustrates an example visual code 300B that has been ripped or torn. In this example, the torn area creates a discontinuity in the pattern of the visual code 300B. Data contained in the area of the tear may be unreadable due to the discontinuity in the pattern of the visual code 300B, even though the bulk of the visual code 300B appears to be available and scannable/readable. Thus, a scan of the visual code 300B may result in a data payload capture that is not necessarily sufficient to identify the visual code 300B and return the associated data to the user.

Figure 4D:
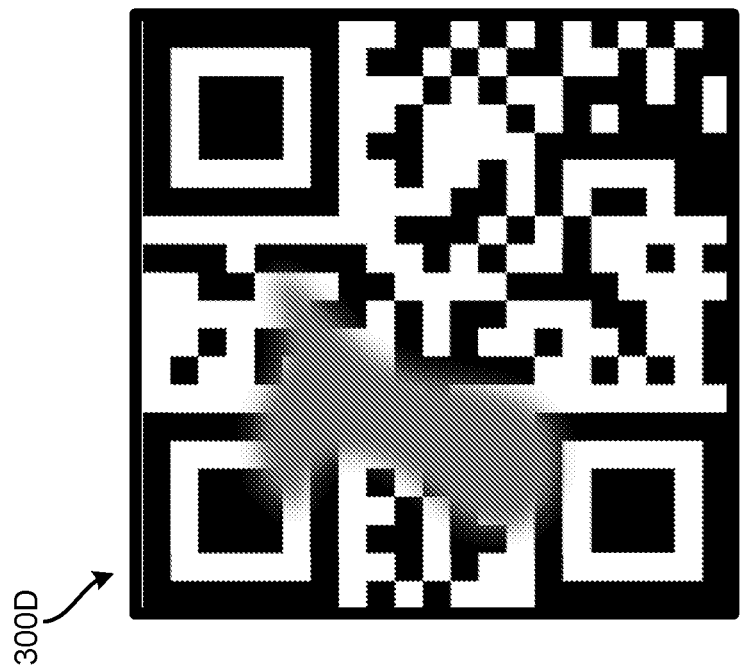
Figure 4C:
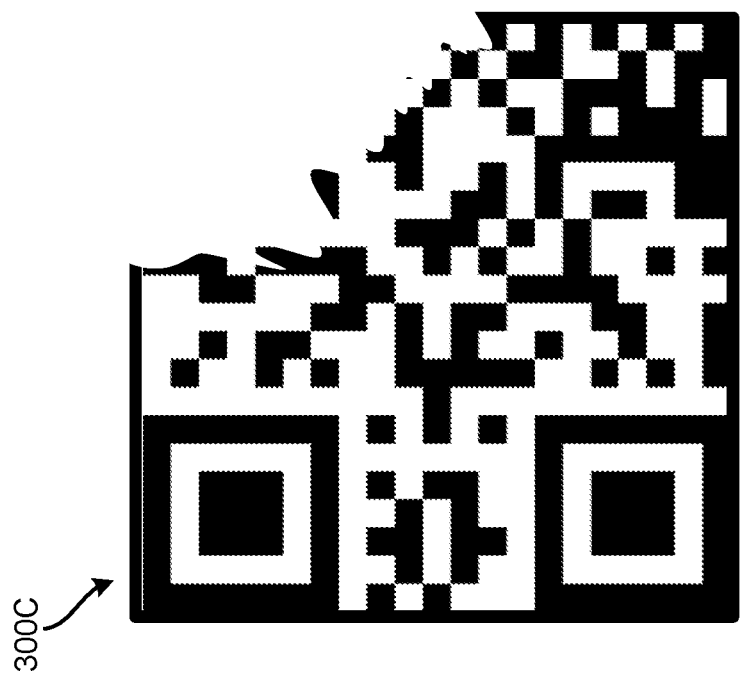

FIG. 4C illustrates an example visual code 300C that has been ripped or torn. The visual code 300C shown in FIG. 4C includes a rip or tear in which a portion of the visual code 300C is missing (rather than the discontinuity in the pattern of the visual code 300B resulting from the rip or tear shown in FIG. 4B). A scan of the visual code 300C will be missing the data contained in the missing portion of the visual code 300C. Thus, a scan of the visual code 300C is likely to result in a data payload capture that is not sufficient to identify, or fully resolve, the visual code 300C, or possibly little to no data capture at all.

FIG. 4D illustrates an example visual code 300D, in which a portion of the visual code 300D is in some way obscured (for example, a spot of dirt, ink, a sticker, a marking, and the like). In this example, data contained in the obscured portion of the visual code 300D is unavailable. A scan of the visual code 300D, which will be missing the data in the obscured portion of the visual code 300D, is likely to result in a data payload capture that is insufficient to identify, or fully resolve, the visual code 300D, or possibly little to no data capture at all.

Figure 4F:
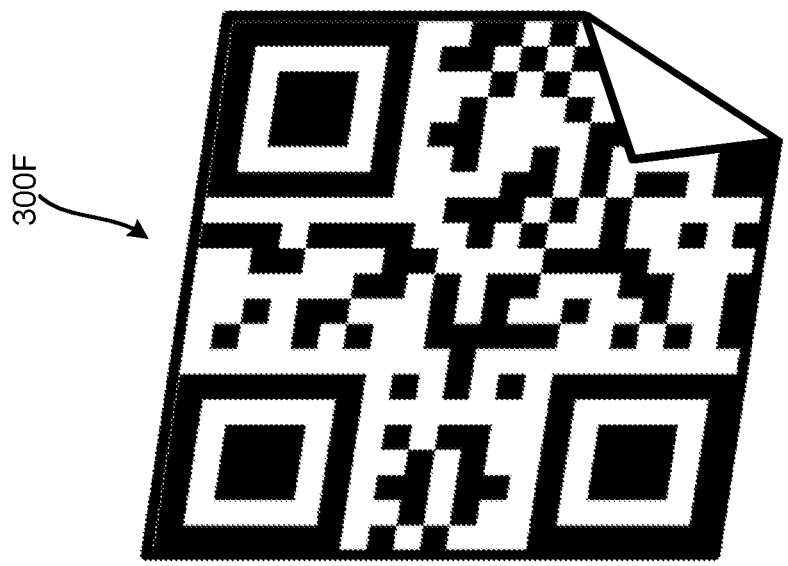
Figure 4E:
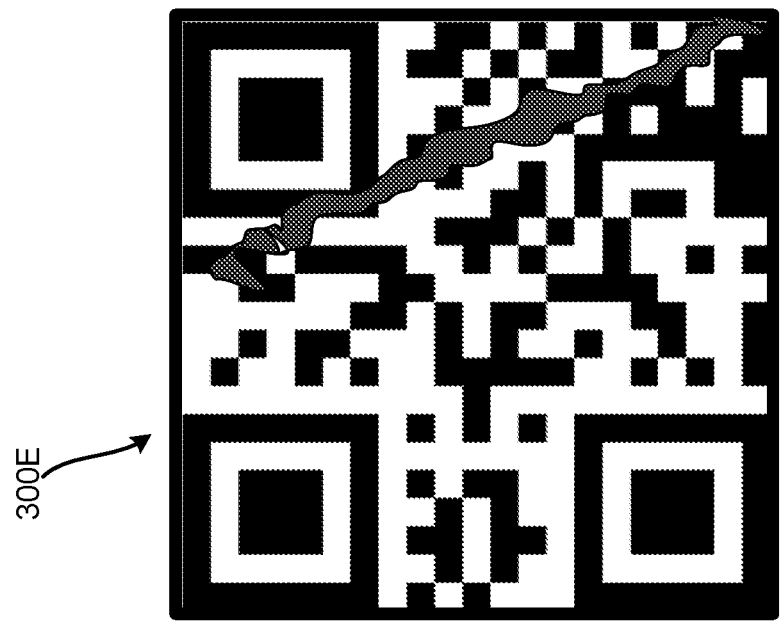

FIG. 4E illustrates an example visual code 300E, in which a portion of the visual code 300E is wrinkled, causing a discontinuity in the pattern of the visual code 300E. Data contained in the area of the discontinuity in the pattern due to the wrinkle may be unreadable. Thus, a scan of the visual code 300E may result in a data payload capture that is insufficient to identify, or fully resolve, the visual code 300E, or possibly little to no data capture at all.

FIG. 4F illustrates an example visual code 300F in which a portion of the visual code 300F is bent, or crimped. In this example, data contained in the bent portion of the visual code 300F may not be captured, or may not be completely captured, by a scan of the visual code 300F. Thus, a scan of the visual code 300F may result in a data payload capture that is insufficient, or fully resolve, to identify the visual code 300F, or possibly little to no data capture at all.

Figure 4H:
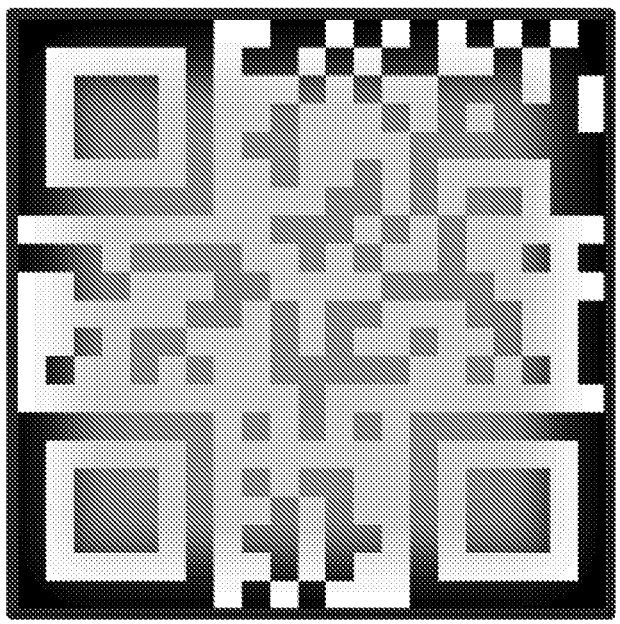
Figure 4G:

FIG. 4G illustrates an example visual code 300G, in which a portion of the visual code 300G is in some way less clear due to, for example, glare, surface treatments on the visual code 300G (for example, lamination, positioning under glass and the like), environmental lighting conditions, and other such factors. In this example, data contained in the unclear portion of the visual code 300G may be incompletely and/or erroneously captured. A scan of the visual code 300G may thus result in an insufficient and/or erroneous data payload capture, or possibly little to no data capture at all.

FIG. 4H illustrates an example visual code 300H, in which a scan of the visual code 300H is, for some reason, unclear or distorted due to, for example, environmental factors such as lighting, distance between the optical device and the visual code 300H, a marred or dirty or in some way compromised lens on the optical device, resolution capability of the optical device, and the like. In this example, the unclear scan of the visual code 300H (even though the visual code 300H may be substantially intact) may result in an insufficient and/or an erroneous capture of the data payload associated with the visual code 300H, or possibly little to no data capture at all.

Figure 4I:
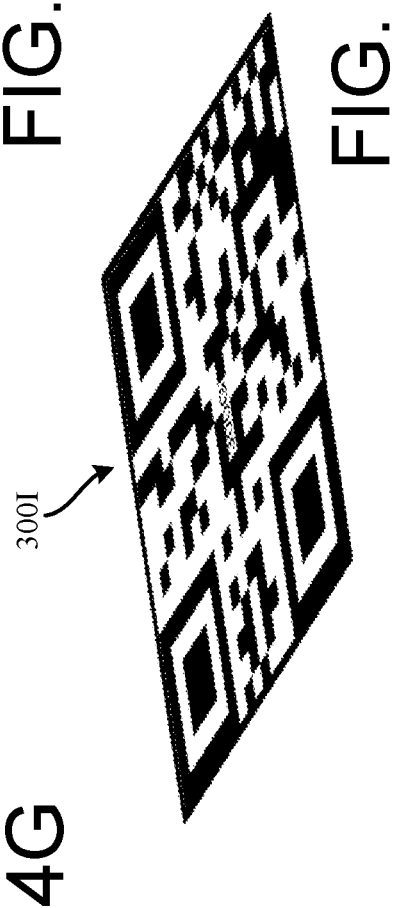

FIG. 4I illustrates an example visual code 300I, in which a scan of the visual code 300I is, for some reason, distorted due to, for example, an orientation of the optical device relative to the visual code 300I, resulting in a distorted scan of the visual code 300I, even though the visual code 300I may be substantially intact. The scan may result in an insufficient and/or an erroneous capture of the data payload associated with the visual code 300I, even though the visual code 300I is substantially intact.

In the examples shown in FIGS. 4B-4I, an optical scan, or read, of the visual codes 300B-300I would likely yield a retrieval of the data payload that is insufficient to identify the visual code 300B-300I and access the information associated with the respective visual code 300B-300I. The retrieval of an insufficient data payload, or essentially no data, may result in, for example, a failure to provide to the user the information associated with the visual code 300B-300I. In the event of a scan that yields a data payload that is insufficient to identify the visual code, or essentially no data payload, the server may use supplemental anchoring information stored, for example, in a database, for comparison with supplemental information collected in association with the scan of the visual code 300, to match the scanned visual code 300 (and insufficient data payload) with one of the stored visual codes. The server (for example, the server 140 shown in FIG. 1) may make this determination at least in part based on information/data that has been previously stored in connection with the visual code by, for example, an owner, or stakeholder associated with the code, previous users/scanners of the visual code, and the like. In some implementations, the supplemental information may include, for example, cloud anchor information. In some implementations, the cloud anchor information may be generated in association with the physical position/location of the visual code, and/or the physical position/location of the device scanning the visual code. In some implementations, the supplemental information may include, for example, location based information including, for example, global positioning system (GPS) based information. In some implementations, the supplemental information may include other types of data that allow for the system to identify the scanned visual code (i.e., discriminate among a plurality of possible visual codes, based on the data available from the compromised code and the supplemental information) and supply the data associated with the identified code to the user.

Figure 5A:
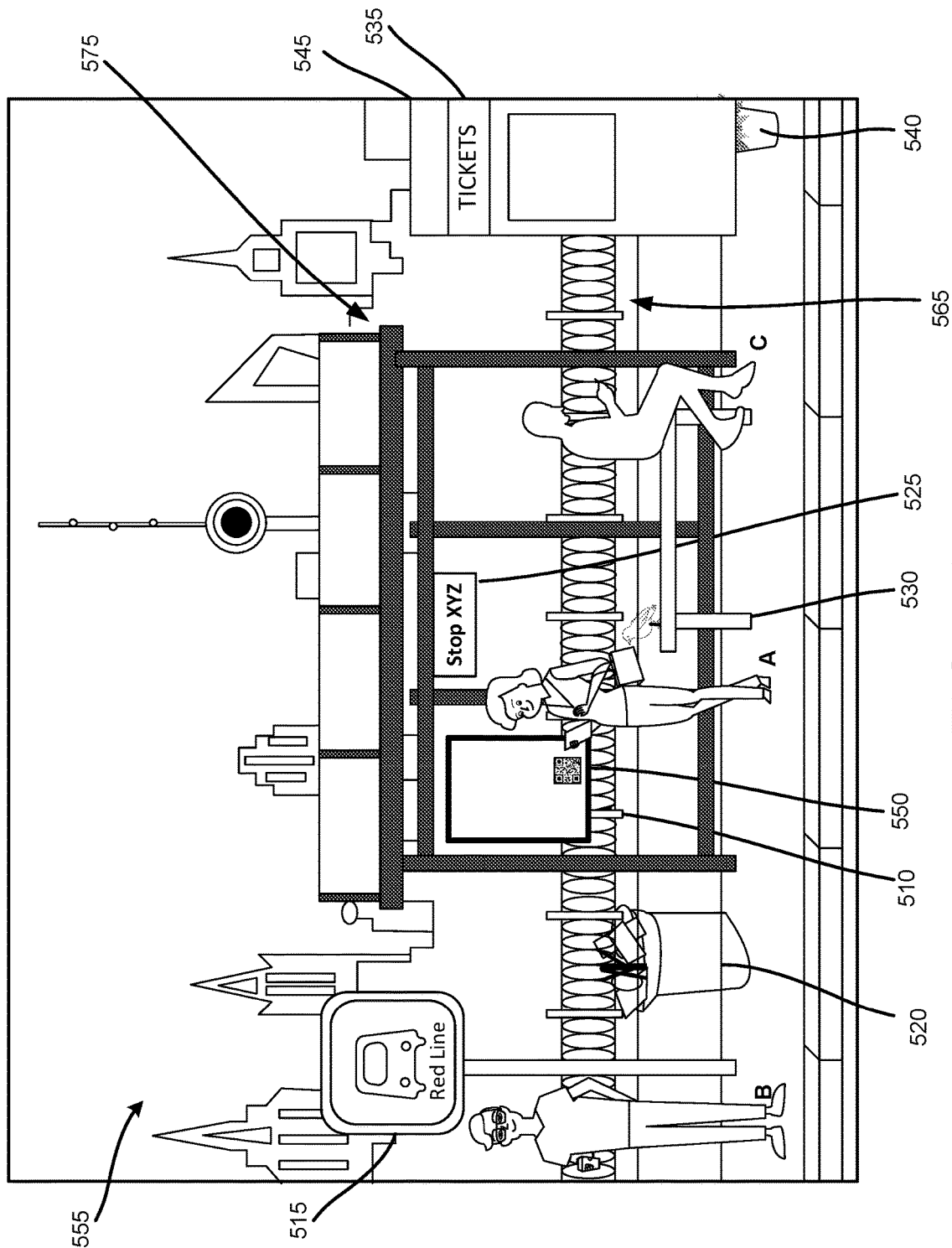
FIGS. 5A and 5B illustrate an example scene, including an example visual code associated with an example entity.
Figure 5B:
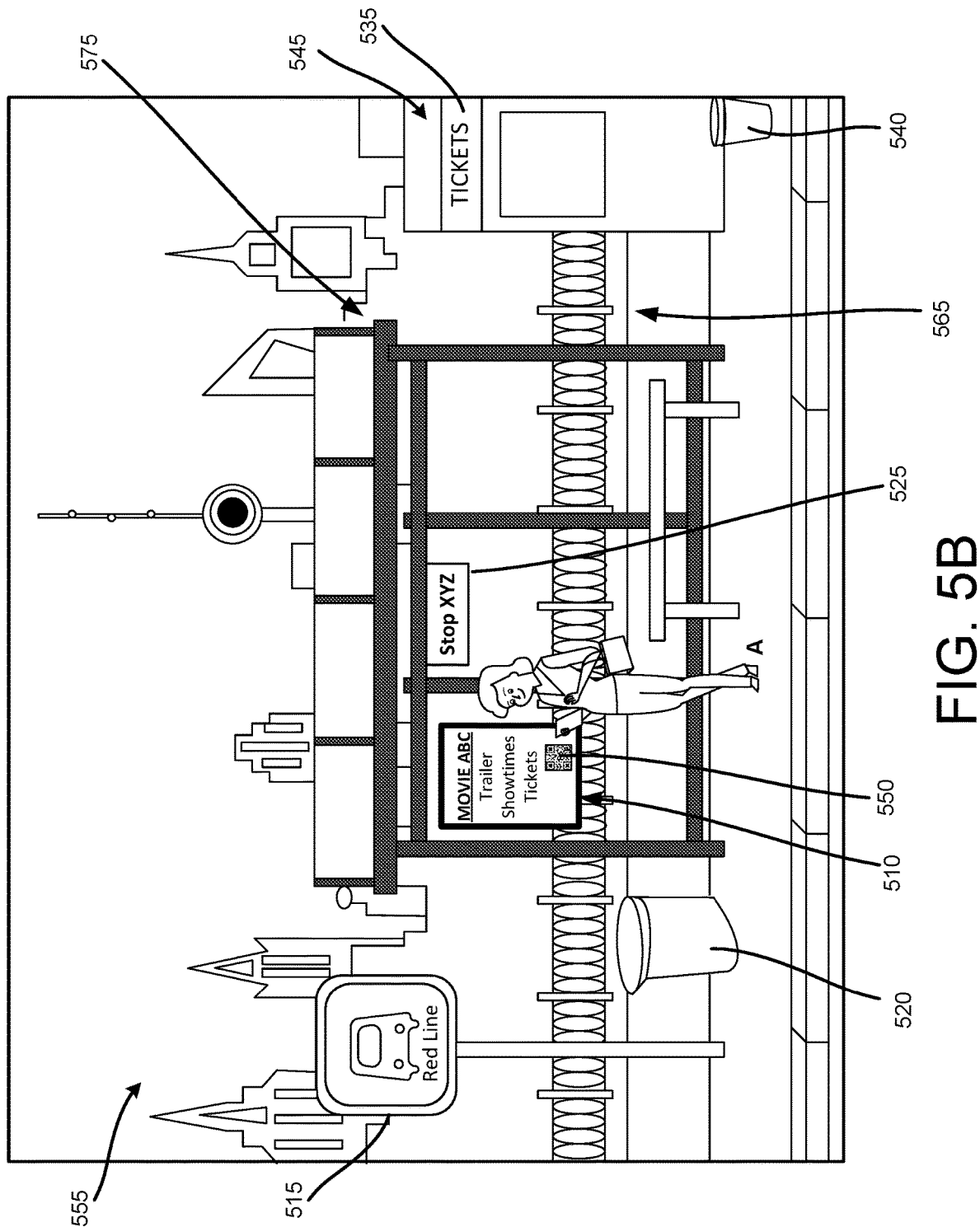

FIGS. 5A and 5B illustrate an example scene, including an example visual code associated with an example entity. The example scene is provided simply for purposes of discussion and illustration of the principles described herein. These principles associated with a system and method, in accordance with implementations described herein, may be applied to other scenarios in which visual codes are used and/or are relied upon to provide data associated with the visual code (i.e., read, scanned and the like by a user using an electronic device, such as, for example, one of the electronic devices described above with respect to FIGS. 1-3). In particular, the principles to be described herein may be applied to other scenarios in which a read or scan of the visual code yields a partial data payload (i.e., a data payload that is insufficient to identify or fully resolve the visual code) due to, for example, the visual code being in some way compromised, for example, physically compromised, the read or scan of the visual code being in some way deficient, and the like.

The example scene shown in FIGS. 5A and 5B includes an example informational notice 510, in the form of an example movie advertisement, or movie poster 510. In this example, the notice 510 is made available (i.e., posted by, for example, a production company, a venue manager, a ticket seller and the like) at a location (an urban bus stop/shelter) which would allow for viewing by a large number of viewers, or users. In this example, the notice 510 includes a visual code 550 that can provide access to additional information regarding the topic of the notice 510. For example, one or more of the users A, B, C shown in FIG. 5A may use an electronic device (such as, for example, one of the electronic devices described above with respect to FIGS. 1-3) to perform a scan, or an optical reading, of the visual code 550. If the visual code 550 is intact, and the scan of the visual code 550 adequately captures the pattern defined by the visual code 550, then the scan may capture the full data payload (or essentially full data payload) associated with the visual code 550. In response to the scan of the visual code and the retrieval of the full data payload associated with the visual code 550, the system may return to the user additional information about the movie advertised by the notice 510, based on the data payload retrieved from the scan of the visual code 550. In this particular example, the system returns information to the user in response to the scan of the visual code 550. However, in some implementations, the scan of the visual code 550 may trigger other types of responses. For example, in some implementations, the scan of the visual code 550 may trigger an action. Such actions could include, for example, a lock/unlock action on a bike, a check-out/check-in of an item, a check-out/check-in related to a reservation, an order placement, and a large number of other types of actions.

As described above, in some situations, the scan, or reading of the visual code 550 may yield only a partial data payload (i.e., a data payload that is insufficient to identify or fully resolve the visual code). The scan may result in retrieval of an insufficient data payload when, for example, the visual code 550 is in some way compromised, for example, physically compromised, or not fully accessible, as described above with respect to the examples shown in FIGS. 4A-4F. As also described above, in some situations, the scan, or reading of the visual code 550 may result in the retrieval of an insufficient data payload even when the visual code 550 is substantially intact, due to, for example, a deficient or incomplete scan, or reading of the visual code 550, as described above with respect to the examples shown in FIGS. 4G-4I. In the event of a scan, or reading, of the visual code 550 that yields an insufficient data payload, and that then renders the visual code 550 unidentifiable, a system and method, in accordance with implementations described herein, may use supplemental anchoring information, associated with, for example, the environment surrounding the visual code 550, the location of the scan, or reading, of the visual code 550, and the like to identify the visual code 550, complete the data payload, and access the information associated with the visual code 550.

In some implementations, the supplemental anchoring information may be provided and/or associated with the visual code 550 at the time of the placement of the notice 510. For example, an owner of the notice 510, a stakeholder in the dissemination of the information provided by the notice 510, or other such entity placing the notice 510, may provide the supplemental anchoring information when placing the notice 510 in a particular location. In some implementations, the owner, or stakeholder, or other such entity, may, for example, register the placement of the notice 510 including the visual code 550 and the associated supplemental anchoring information, in a database, such as, for example, the database 144 associated with the server 140 described above with respect to FIG. 1. This may be accessible to subsequent users/user devices such as, for example, users of the electronic device(s) 200 described above with respect to FIG. 3, scanning the visual code 550. In some implementations, the supplemental anchoring information associated with the code 550 may be collected over time, and stored in the database, based on scans of the visual code 550 by users/user devices. These anchors, or supplemental anchoring information, may be used by the system, together with the partial data payload (captured by a scan of an incomplete visual code, or an insufficient scan of an intact visual code, yielding an insufficient data payload, or no data payload), to identify the scanned visual code 550, and to complete the incomplete data payload based on matching with visual codes and supplemental anchoring information previously stored in the database.

In some implementations, the supplemental anchoring information may include, for example, location based information such as, for example, GPS information as described above. Location based information, or GPS based information may provide location based anchoring information associated with the visual code 550. In some implementations, the supplemental information may include other types of information which may allow the system to match and identify the visual code 550 from the insufficient data payload retrieved from the scan. In some implementations, the supplemental information may include, for example, feature based information related to the environment, or surrounding area, in which of the visual code 550 is placed. In some implementations, this type of feature based supplemental information may include features that are substantially consistent, or persistent, rather than somewhat temporary or elements in the environment that are somewhat subject to change. The anchoring of the visual code 550 in the environment in which it is placed provided by the feature based information, may, as described above, be stored in a database, and accessible to user device(s) via a network and server, to provide for a relatively consistent identification of the visual code 550, even in the event of an insufficient data payload, and the subsequent completion of the data payload and access to the information associated with the visual code 550.

The example scene shown in FIG. 5A includes numerous examples of substantially consistent, or permanent features which may be captured in a scan, and which may serve as anchoring features which anchor the visual code 550 in the environment. Capture of these features in a scan, together with the partial/incomplete/no data payload from the scan of the visual code 550 may be used to identify the visual code 550, even in the event that the scan yields the incomplete data payload (i.e., data payload that is insufficient to identify the visual code 550), or no data. For example, the system may identify the captured features to, for example, discriminate location. In some implementations, the system may identify the captured features and match the identified features to features previously stored in a database, in association with one or more visual codes to which the incomplete data payload may be correlated, to discriminate and identify the scanned visual code 550 based on the incomplete data payload.

As noted, the example scene shown in FIG. 5A includes numerous s features which may form the basis for supplemental anchoring information, and which may be used to identify the visual code 550 in the event of a scan of the visual code 550 that yields a data payload that is insufficient to identify, or fully resolve the visual code 550. For example, a structure of the shelter 575, a structure of the fencing 565, and the skyline 555 may be relatively unchanging, or consistent, or persistent, in this scene, and thus provide reliable, consistent environmental features that can be associated with the placement of the visual code 550 in this example scene. Signs 515, 525 and 535 may also be relatively consistent, or persistent features in the example scene, and character recognition of the content of the signs 515, 525, 535 may provide additional supplemental information which may be used to discriminate/identify the visual code 550, together with the partial/incomplete data payload. Scans of the visual code 550, over time, by numerous different users/user devices, may provide supplemental anchoring information associated with the visual code 550. Supplemental anchoring information collected in this manner may be stored in the database, in association with the visual code 550, for access in response to scans by subsequent users/user devices. Supplemental anchoring information collected in this manner may also be used to confirm and/or update previously stored supplemental anchoring information which may have changed over time.

Other features included in the example scene shown in FIG. 5A, reflecting a first point in time, may be somewhat less consistent. FIG. 5B illustrates the example scene shown in FIG. 5A, but at a second point in time. When comparing the example scenes shown in FIGS. 5A and 5B, the relatively consistent elements (for example, the signs 515, 525, 535, the ticket booth 545, the skyline 565, the shelter 575, and other such elements or features within the example scene) remain in place, providing environmental anchors which may be stored in association with the visual code 550. In contrast, other features within the scene have changed between the first point in time represented by FIG. 5A and the second point in time represented by FIG. 5B. For example, the bird 530 shown in FIG. 5A is no longer on the bench in the shelter 575 in FIG. 5B. Users B and C have left the example scene, and only user A remains in FIG. 5A. The trash receptacle 520, which was overflowing in FIG. 5A, has been emptied in FIG. 5B. The potted plant 540 was in bloom in FIG. 5A, but has experienced defoliation in FIG. 5B.

Thus, the bird 530, and the users B and C, are temporary, or changing, or inconsistent elements in the example scene. Similarly, although the trash receptacle 520 and the potted plant 540 may remain in substantially the same place, the form, or outline, or appearance of these elements in the scene may change, or be somewhat inconsistent. These temporary, or changing elements, are thus less reliable than the more consistent elements (i.e., the signs 515, 525, 535, the ticket booth 545, the skyline 565, the shelter 575 and other such elements) in providing supplemental anchoring information for the discrimination/identification of the visual code 550. As noted above, in some implementations, supplemental anchoring information collected based on scans of the visual code 550 by users/user devices over time may be used to confirm and/or update previously stored supplemental anchoring information which may have changed over time, thus improving accuracy of matching and identification of the visual code 550.

As noted above, in some implementations, the capture of the supplemental information, and the storage of the supplemental information in the indexed database in association with the visual code 550 (for access in matching with deficient scans/insufficient data payloads from subsequent users/user devices) may be carried out by, for example, an owner or stakeholder, or other entity associated with the placement of the visual code 550. For example, in some implementations, this may include providing location information, for example, GPS location, or GPS coordinates, associated with the placement position of the visual code 550. In some implementations, this may include an image capture of an environment, or an area surrounding the placement of the visual code 550. In some implementations, images may be stored in the indexed database, in association with the visual code 550 and the complete data payload represented by the pattern of the visual code 550, for later matching. As also noted above, supplemental anchoring information may be collected over time and/or confirmed and updated over time, based on scans of the visual code 550 by subsequent users/user devices.

A scan of the visual code 550 may, for one or more of the reasons described above, yield a data payload from which the visual code 550 cannot be readily identified. This may cause incomplete information, or erroneous information, or no information, to be returned to the user in response to the scan of the visual code 550. In a situation in which the supplemental anchoring includes location information, in the form of, for example, GPS information, GPS information, for example, provided by the user device together with the partial data payload, may be matched to a visual code previously stored in the indexed database, to identify the scanned visual code 550 and return relevant information to the user in response to the scan of the visual code 550. In some implementations, this healing, or restoration, of the visual code 550 may be substantially transparent to the user. That is, the sharing of the location information, the matching of the scanned visual code 550 to a visual code in the database based on the partial data payload and the location information, the healing, or restoration of the visual code 550 and the return of information to the user, may be accomplished with little to no additional action or intervention by the user.

In some situations, location information, particularly in the form of GPS information, may not be available, either for storage in association with the visual code 550 at the time of placement of the visual code 550. In some situations, location information, particularly in the form of GPS information, may not be available when a subsequent user/user device scans the visual code 550. As noted above, other types of supplemental anchoring information may be relied upon to provide for the healing, or restoration, or completion of the visual code 550 in the event of a scan that yields a data payload that is insufficient for identification of the visual code 550.

For example, in some implementations, a user scan of the visual code 550 may also capture at least some of the more persistent, consistent features in the area surrounding the visual code 550/example notice 510 in this example scene. When the visual code 550 is, for some reason, not identified based only on the scan of the visual code 550 (i.e., the scan is in some manner incomplete and/or insufficient, and/or yields an incomplete data payload, as described above), this capture of at least some of the persistent, consistent features may facilitate the matching of the scanned visual code 550 with a visual code stored in the indexed database, for completion of the data payload associated with the scanned visual code 550.

In some implementations, the supplemental anchoring information may rely on optical character recognition of features in the area of the scanned visual code 550, to identify and complete the scanned visual code 550. For example, in the example scene shown in FIGS. 5A and 5B, a scan of the visual code 550 may also capture an image of one or more of the signs 515, 525, 535. In some implementations, optical character recognition may be used to parse the content of the signs 515, 525, 535. In this case, the supplemental anchoring information may be based on the content of one or more of the signs 515, 525, 535, alone or together with a position of the one or more of the signs 515, 525, 535 relative to the visual code 550. This supplemental anchoring information may be applied in the matching of the scanned visual code 550/incomplete data payload with a visual code previously stored in the database, to provide for the healing of the scanned visual code 550 and the return of relevant information to the user.

In some implementations, the scan of the visual code 550 may capture images of other substantially consistent, persistent features in the area surrounding the visual code 550. For example, in the example scene shown in FIGS. 5A and 5B, a scan of the visual code 550 may also capture image(s) of the structure of the shelter 575, the structure of the fence 565, the skyline 555 and the like. In some implementations, the supplemental anchoring information may be based on, for example, image recognition of one or more elements captured within the image(s). For example, image recognition may be used to detect, for example, an iconic building within the skyline 555, a particular pattern within the structure of the fence 565 and the like. The identification of one or more of these features, alone or together with a position thereof relative to the visual code 550, may be applied in the matching of the scanned visual code 550/insufficient data payload with a visual code previously stored in the database, to provide for the healing of the scanned visual code 550 and the return of relevant information to the user.

Figure 5C:
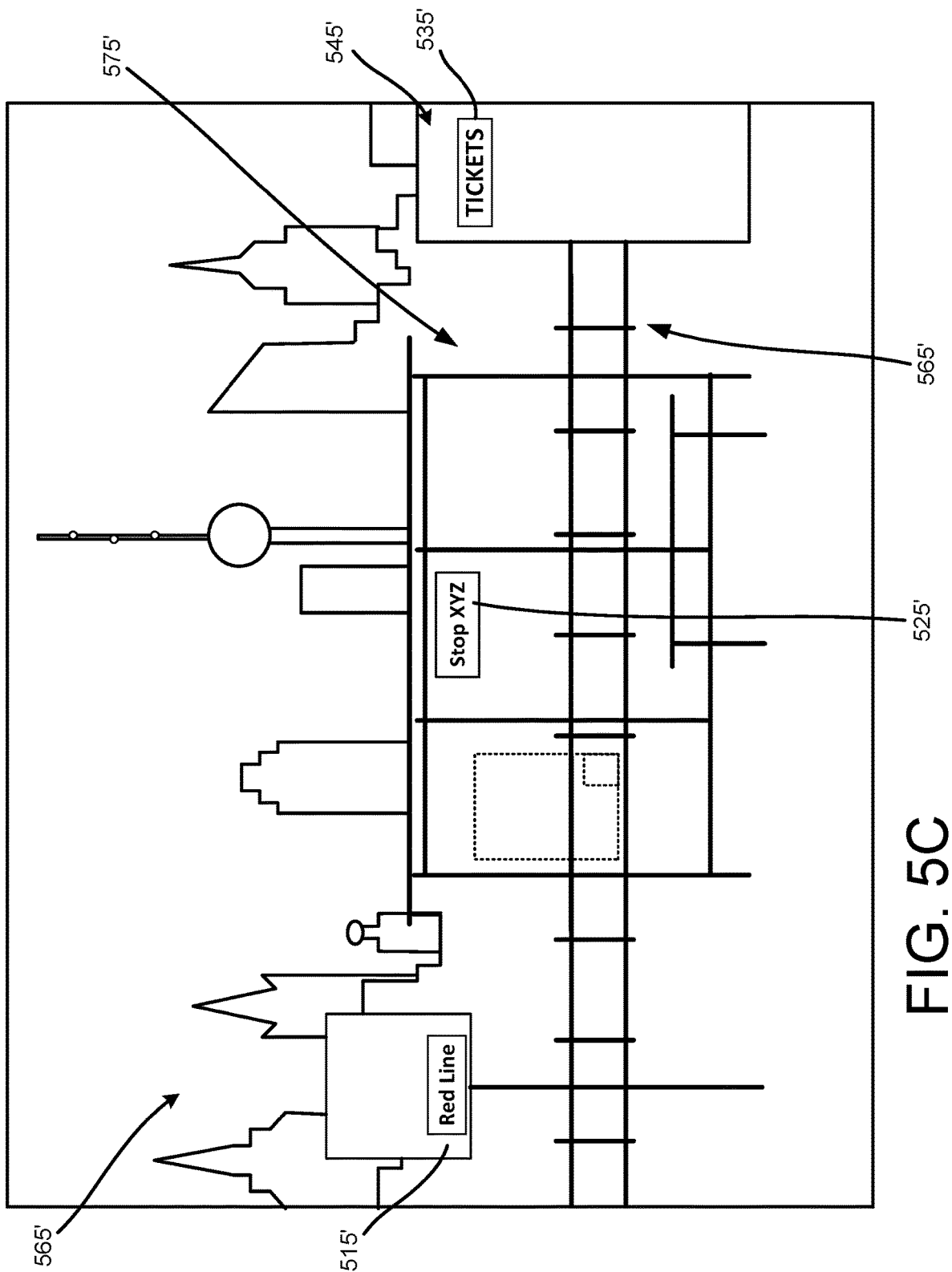
FIG. 5C is a schematic diagram of permanent features of the example scene shown in FIGS. 5A and 5B.

FIG. 5C illustrates an example of a matching of features of at least some of the substantially persistent, or consistent, elements of the scene shown in FIGS. 5A and 5B, between that which is captured and stored in association with the visual code 550 (for example, by an owner, or stakeholder, in the placement of the visual code 550 and/or by scans performed by subsequent users/user devices), and that which is captured in the scan of the visual code 550 that yields a data payload that is insufficient for identification of the visual code 440. FIG. 5C illustrates an example of a physical mapping of the features of the scene shown in FIGS. 5A and 5B, which may be used as a basis of comparison when matching images captured in a scan of the visual code 550 with previously stored visual codes and associated supplemental anchoring information.

The example shown in FIG. 5C delineates at least some of the prominent features of the permanent elements of the scene. For example, the ticket booth 545 shown in FIGS. 5A and 5B is represented by element 545' in FIG. 5C, essentially corresponding to the outer contour of the ticket booth 545. The skyline 555 shown in FIGS. 5A and 5B is represented by element 555' in FIG. 5C, essentially corresponding to an outline, or contour of the skyline 555. Similarly, the fence 565 and the shelter 575 shown in FIGS. 5A and 5B are represented by elements 565' and 575', respectively, in FIG. 5C. In the example shown in FIG. 5C, the schematic representations of signs 515', 525', 535' have retained the characters associated with the signs 515, 525 535, for use in optical character recognition when comparing the scan of the visual code 550 to the stored visual codes and supplemental anchoring information.

In the example shown in FIG. 5C, the elements 515', 525', 535', 545', 555', 565' and 575' may be representative of at least some of the substantially persistent, or consistent features of the scene shown in FIGS. 5A and 5B, in the area surrounding the visual code 550. In some implementations, the elements 515', 525', 535', 545', 555', 565' and 575' representing the substantially persistent, or consistent features may omit detailed features of the elements 515, 525, 535, 545, 555, 565 and 575, while still providing ample representation of the elements. In some implementations, the representation(s) 515', 525', 535', 545', 555', 565' and 575' of the elements 515, 525, 535, 545, 555, 565 and 575 may define supplemental anchoring information associated with the visual code 550. Accordingly, in some implementations, a scan of the visual code 550 (particularly, in a situation in which the visual code 550 and/or the scan of the visual code 550 is in some way deficient, or inadequate) may rely on the supplemental anchoring information provided by the associated representation(s) 515', 525', 535', 545', 555', 565' and 575' of the elements 515, 525, 535, 545, 555, 565 and 575 to facilitate the matching of the visual code 550 to a previously stored visual code. The matching of the scanned visual code 550 to the previously stored visual code, with the help of the supplemental anchoring information, may provide for completion of the data payload associated with the visual code 550, and may allow for relevant information to be returned to the user in response to the scanning of the visual code 550.

As noted above, in some situations, a scan of the visual code 550 may return essentially no data specifically associated with the scan. For example, in some implementations, the visual code 550 placed by the owner, or stakeholder in a particular location, may be a substantially generic code. In this situation, a scan of the generic code may yield essentially no data, but may trigger collection of supplemental information that is used to identify the information to be accessed by the scanning of the visual code 550. For example, access to the information associated with the generic visual code at a particular location may rely only on the supplemental information associated with the generic code placed at that location.

In some implementations, the data payload associated with a scan of a visual code at a particular location, and associated supplemental information collected with the scan, may be compared to visual codes and associated supplemental information stored in the database, even when the data payload associated with the scan of the visual code may be sufficient to identify the visual code. In some situations, the system may detect that the scanned visual code/associated data payload does not match the expected visual code/data payload at a particular location, based on a comparison of the collected supplemental information and the stored supplemental information. Detection of a mismatch in this manner may provide an indication of, for example, possible fraudulent placement of a visual code. For example, in a situation in which a visual code is provided at a certain location to allow for payment processing using the visual code, mismatch detected in this manner may provide an indication that the visual code has been replaced with a fraudulent visual code which would direct a payment using the visual code to an unintended recipient.

Figure 6:
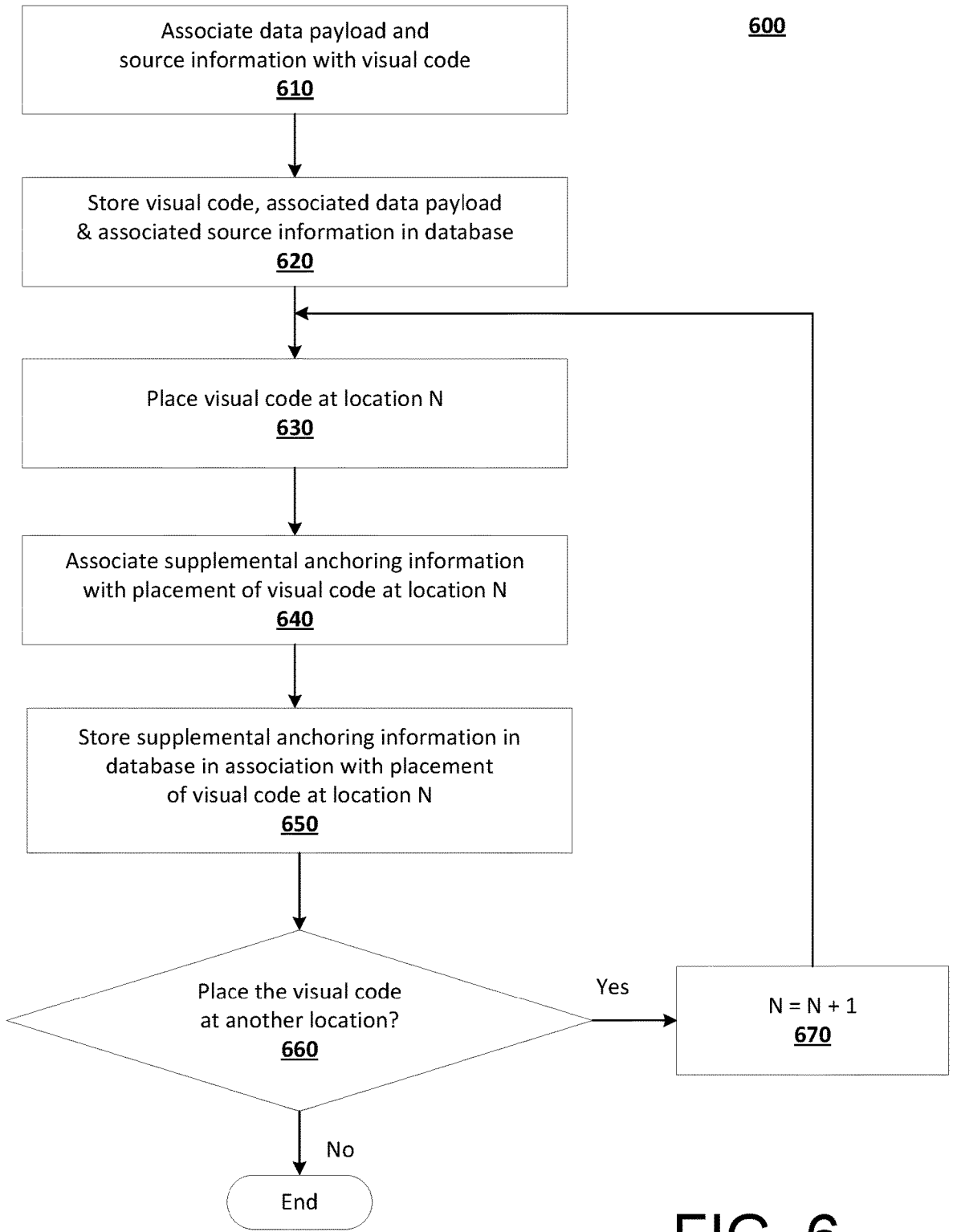
FIG. 6 is a flowchart of an example method, in accordance with implementations described herein.

FIG. 6 is a flowchart of an example method 600, in which a visual code, such as, for example, a visual code as described above, is placed at a location, with source information associated with the visual code, and anchoring information associated with the visual code, stored in a database, in accordance with implementations described herein.

An entity such as, for example, an owner, a stakeholder and the like, may choose to make source information available to users through the use of visual codes, for scanning, or reading, by one or more different types of electronic devices, as described above. Thus, an entity may develop a visual code, including a data payload, associated with source information (block 610). The visual code, including the data payload and the associated source information, may be stored in an indexed database, such that the indexed database is accessible to users/user devices via, for example a network and/or a server, as described above (block 620). The entity may place the visual code at one or more locations that are accessible to users/user devices for scanning, reading and the like (block 630).

In some implementations, supplemental anchoring information may be associated with the placement of the visual code at a particular location (block 640), and stored in the indexed database, in association with the visual code (block 650). In some implementations, the supplemental anchoring information may be provided by, for example, the entity, or owner, or stakeholder, placing the visual code at the particular location. In some implementations, the supplemental anchoring information may be provided by one or more users/user devices scanning, or reading the visual code to access the source information associated with the visual code. In some implementations, initial supplemental anchoring information can be provided by the entity placing the visual code at the location, and additional supplemental anchoring information can be provided by one or more users/user devices scanning or reading the visual code for access to the source information associated with the visual code.

In some implementations, the supplemental anchoring information may include, for example, location based information, including, for example, GPS based information. In some implementations, the supplemental anchoring information may include image information, or optical information such as, for example, image information associated with the placement location, or placement area, of the visual code, as described above. In some implementations, the supplemental anchoring information may include other types of information such as, for example, light signals, audio signals, and other such information which may be associated with a particular location.

In some implementations, the visual code may be placed in more than one location (blocks 660, 670). In this situation, location specific supplemental anchoring information may be provided at the placement of the visual code at each particular location. In some implementations, the supplemental anchoring information associated with the placement of the visual code may be specific to a particular placement location of the visual code. This may allow for more relevant information to be transmitted to the user/user device in response to the scanning, or reading of the visual code.

Figure 7:
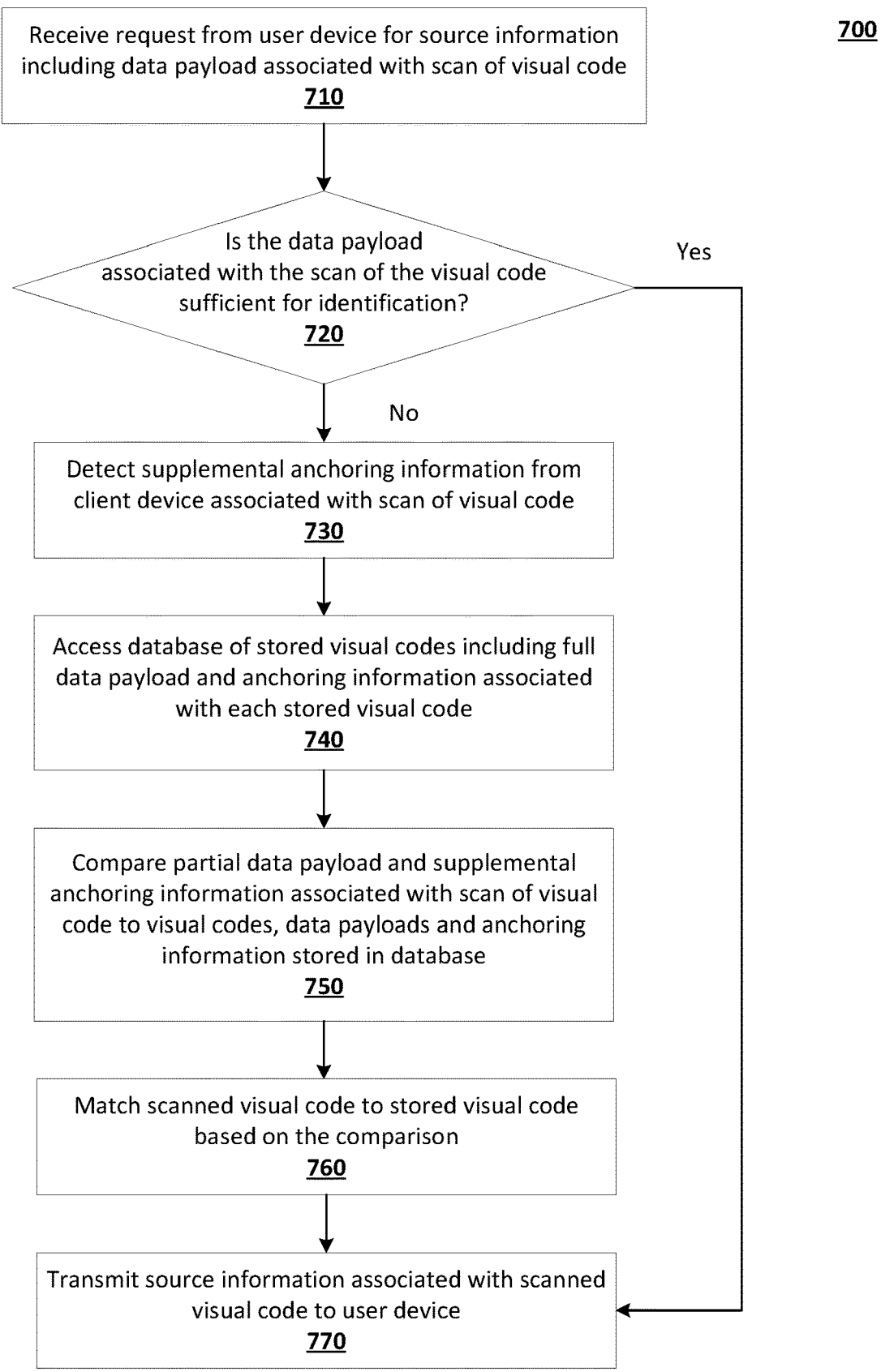
FIG. 7 is a flowchart of an example method, in accordance with implementations described herein.

FIG. 7 is a flowchart of an example method 700, in which a server may process a request for source information associated with a visual code, such as, for example, a visual code as described above, in accordance with implementations described herein.

A user operating a user device, such as, for example, one of the electronic devices described above, may scan, or read a visual code, so as to gain access to source information associated with the visual code. In some implementations, the user device may transmit a request for source information to a server. In some implementations, the request may include a data payload associated with the scan of the visual code (block 710). As described above, in some situations, the visual code may be in some way compromised, or damaged, and/or the scan of the visual code may be in some way compromised, or deficient. The scan of a compromised visual code, and/or a compromised or deficient scan of a visual code (whether the visual code is substantially intact, or in some way compromised), may result in the retrieval of a data payload that is insufficient to identify the visual code (block 720).

In some implementations, in response to a determination that the data payload associated with the scan of the visual code is incomplete, such that the visual code, and associated source information, cannot be identified, the server may detect supplemental anchoring information associated with the scan, by the user device, of the visual code (block 730). For example, the request may comprise the supplemental information. Alternatively, or in addition, the server may request and/or receive the supplemental information from the user device and/or from another device, e.g., in response to the determination that the data payload associated with the scan of the visual code is incomplete. As noted above, in some implementations, the supplemental anchoring information may include location based information such as, for example, GPS based information. In some implementations, the supplemental anchoring information may include image based information, optical character recognition information and the like, in the location or area in which the visual code is scanned by the user device. In some implementations, this type of information may have been captured, for example, peripherally the visual code was scanned, at points in time just before and/or after the scanning of the visual code, and the like.

In some implementations, in response to the determination that the data payload associated with the scan of the visual code is insufficient to identify the visual code, the server may access an indexed database of supplemental anchoring information associated with visual codes, to facilitate the identification of the visual code (block 740). The server may compare the partial data payload associated with the scan of the visual code, alone or together with the supplemental anchoring information collected in association with the scan of the visual code, to visual codes, (complete) data payloads, and anchoring information stored in the indexed database (block 750). The server may match the scanned visual code (including the partial data payload) to a stored visual code (including a complete data payload) based on the comparison. This may comprise matching the scan of the visual code to a stored visual code. The server may transmit the requested source information associated with the scanned visual code to the user/user device based on the matching (block 770).

In a system and method, in accordance with implementations described herein, supplemental information may be used, in combination with the portion of the visual code that is readable, to identify the visual code, and to provide the requested information to the user, even in the event of a scan of a compromised visual code and/or an inadequate scan of the visual code which yields only a portion of the data payload associated with the visual code. The healing of the visual code in this manner may be a substantially transparent process from the user perspective, requiring little to no user intervention beyond the scan of the visual code. This may facilitate ready access to information, even when the condition of the visual code has been damaged and/or in some way compromised, and/or the scan of the visual code is in some way deficient, thus enhancing the user experience.

FIG. 8 shows an example of a generic computer device 2000 and a generic mobile computer device 2050, which may be used with the techniques described herein. Computing device 2000 is intended to represent various forms of digital computers, such as laptops, desktops, tablets, workstations, personal digital assistants, televisions, servers, blade servers, mainframes, and other appropriate computing devices. For example, computing device 2000 may be and/or be used as the server 140 of FIG. 1. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. The processor 2002 can be a semiconductor-based processor. The memory 2004 can be a semiconductor-based memory. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user.

The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provided as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smartphone 2082, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A computer-implemented method, comprising:
receiving a request from a user electronic device, the request including a data payload associated with a scan of a visual code;
detecting supplemental information associated with the visual code, wherein the supplemental information includes location information associated with the scan of the visual code;
matching the scan of the visual code with one of a plurality of stored visual codes based on comparing the data payload with data payloads associated with the plurality of stored visual codes and based on comparing the location information associated with the scan of the visual code with location information associated with the plurality of stored visual codes; and
transmitting to the user electronic device, a response to the request in response to the matching.

2. The computer-implemented method of claim 1, wherein the accessing includes:
accessing anchoring information associated with the plurality of stored visual codes, the anchoring information including the location information associated with the plurality of stored visual codes and second information associated with the plurality of stored visual codes.

3. The computer-implemented method of claim 2, wherein the matching of the scan of the visual code with one of the plurality of stored visual codes includes:
comparing second information included in the supplemental information associated with the scan of the visual code to the second information of the anchoring information associated with the plurality of stored visual codes.

4. The computer-implemented method of claim 1, wherein the detecting of the supplemental information associated with the scan of the visual code includes at least one of:
detecting image based information in an area surrounding the scan of the visual code;
detecting character based information in the area surrounding the scan of the visual code; or
detecting audio based information associated with the scan of the visual code.

5. The computer-implemented method of claim 4, wherein:
the detecting image based information includes receiving a delineation of persistent features in the area surrounding a location of the scan of the visual code; and
the detecting character based information includes receiving character information captured within the area surrounding the scan of the visual code.

6. The computer-implemented method of claim 4, wherein the detecting of the image based information includes:
detecting stationary elements in the area surrounding the scan of the visual code; and
detecting a contour delineating the stationary elements.

7. The computer-implemented method of claim 4, wherein the matching of the scanned visual code with one of the plurality of stored visual codes further includes at least one of:

matching the image based information associated with the scan of the visual code with image information associated with one of the plurality of stored visual codes;
matching the character based information associated with the scan of the visual code with character based information associated with one of the plurality of stored visual codes; or
matching the audio based information associated with the scan of the visual code with audio based information associated with one of the plurality of stored visual codes.

8. The computer-implemented method of claim 1, wherein the receiving includes at least one of:
receiving the request based on the scan of the visual code, the visual code being damaged; or
receiving the request based on the scan of the visual code, the scan of the visual code being incomplete.

9. The computer-implemented method of claim 8, wherein the matching of the scan of the visual code with one of the plurality of stored visual codes includes:
comparing the data payload associated with the scan of the visual code to a plurality of complete data payloads respectively associated with the plurality of stored visual codes; and
identifying the scan of the visual code based on the comparing of the data payload associated with the scan of the visual code to the plurality of complete data payloads respectively associated with the plurality of stored visual codes.

10. The computer-implemented method of claim 9, wherein the matching of the scan of the visual code with one of the plurality of stored visual codes includes:
comparing the supplemental information associated with the scan of the visual code to second information included in anchoring information associated with the plurality of stored visual codes, the anchoring information also including the location information associated with the plurality of stored visual codes; and
identifying the visual code based on the comparing of the data payload associated with the scan of the visual code to the plurality of complete data payloads associated with the plurality of stored visual codes, and based on the comparing of the supplemental information associated with the scan of the visual code and the second information associated with the plurality of stored visual codes.

11. The computer-implemented method of claim 1, wherein the matching of the scan of the visual code with one of the plurality of stored visual codes includes:
comparing the data payload and the supplemental information associated with the scan of the visual code with the data payloads associated with the plurality of stored visual codes and anchoring information associated with the plurality of stored visual codes, the anchoring information including the location information associated with the plurality of stored visual codes and second information associated with the plurality of stored visual codes;
identifying, based on the comparing, a visual code of the plurality of stored visual codes, corresponding to the supplemental information associated with the scan of the visual code; and
detecting, a mismatch between the scan of the visual code and the identified visual code.

12. The computer-implemented method of claim 11, wherein the transmitting of the response includes:

transmitting to the user electronic device, an indication of the mismatch in response to the request.

13. The computer-implemented method of claim 1, wherein the transmitting of the response includes at least one of:
   transmitting source information in response to the request and the scan of the visual code based on the matching; or
   triggering an action defined by the request based on the matching.

14. The computer-implemented method of claim 1, wherein the detecting the supplemental information associated with the visual code comprises
   receiving the supplemental information associated with the visual code from the user electronic device.

15. The computer-implemented method of claim 1, further comprising detecting the data payload associated with the scan of the visual code is insufficient to identify the visual code.

16. A system comprising a server adapted to:
   receive, from a user electronic device, a request for source information, the request including a data payload associated with a scan of a visual code;
   detect supplemental information associated with the scan of the visual code, wherein the supplemental information includes location information associated with the scan of the visual code;
   match the scan of the visual code with one of a plurality of stored visual codes based on comparing the data payload with data payloads associated with the plurality of stored visual codes and based on comparing the location information associated with the scan of the visual code with location information associated with the plurality of stored visual codes; and
   transmit, to the user electronic device, the source information in response to the match.

17. The system of claim 16, wherein the data payload associated with the scan of the visual code is an incomplete data payload.

18. A computer-implemented method, comprising:
   receiving a request from a user electronic device, the request including a data payload associated with a scan of a visual code;
   detecting supplemental information associated with the scan of the visual code, wherein the supplemental information includes image based information associated with the scan of the visual code;
   matching the scan of the visual code with one of a plurality of stored visual codes based on comparing the data payload with data payloads associated with the plurality of stored visual codes and based on comparing the image based information associated with the scan of the visual code with image based information associated with the plurality of stored visual codes; and
   transmitting to the user electronic device, a response to the request in response to the matching.

19. A computer-implemented method, comprising:
   receiving a request from a user electronic device, the request including a data payload associated with a scan of a visual code;
   detecting supplemental information associated with the scan of the visual code, wherein the supplemental information includes audio based information associated with the scan of the visual code;
   matching the scan of the visual code with one of a plurality of stored visual codes based on comparing the data payload with data payloads associated with the plurality of stored visual codes and based on comparing the audio based information associated with the scan of the visual code with audio based information associated with the plurality of stored visual codes; and
   transmitting to the user electronic device, a response to the request in response to the matching.

* * * * *